(12) United States Patent
Wagner

(10) Patent No.: US 8,576,058 B2
(45) Date of Patent: *Nov. 5, 2013

(54) METHOD, SYSTEM, AND SYSTEM COMPONENTS FOR THE WIRELESS MONITORING OF A TIRE PRESSURE

(75) Inventor: Markus Wagner, Ludwigsburg (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 297 days.

This patent is subject to a terminal disclaimer.

(21) Appl. No.: 12/989,910

(22) PCT Filed: Apr. 28, 2009

(86) PCT No.: PCT/DE2009/000582
§ 371 (c)(1),
(2), (4) Date: Oct. 27, 2010

(87) PCT Pub. No.: WO2009/132625
PCT Pub. Date: Nov. 5, 2009

(65) Prior Publication Data
US 2011/0043353 A1    Feb. 24, 2011

(30) Foreign Application Priority Data
Apr. 29, 2008 (DE) .......................... 10 2008 021 469

(51) Int. Cl.
*B60C 23/00* (2006.01)
(52) U.S. Cl.
USPC ............. 340/442; 340/444; 340/447; 73/146; 73/146.5
(58) Field of Classification Search
USPC ......... 340/442, 444, 445, 447; 73/146, 146.2, 73/146.4, 146.5
See application file for complete search history.

(56) References Cited

U.S. PATENT DOCUMENTS

| | | | |
|---|---|---|---|
| 6,034,597 A | 3/2000 | Normann et al. | |
| 6,232,875 B1* | 5/2001 | DeZorzi | 340/442 |
| 6,963,274 B2* | 11/2005 | Saheki et al. | 340/447 |
| 7,034,671 B2* | 4/2006 | Miyazaki | 340/445 |
| 7,212,105 B2* | 5/2007 | Okubo | 340/447 |
| 7,443,288 B2* | 10/2008 | Dunbridge et al. | 340/444 |
| 8,063,756 B2* | 11/2011 | Watabe | 340/447 |
| 2003/0156022 A1 | 8/2003 | Saheki et al. | |
| 2005/0110623 A1 | 5/2005 | Schulze et al. | |
| 2005/0179530 A1 | 8/2005 | Stewart et al. | |
| 2006/0028324 A1 | 2/2006 | Oesterling et al. | |
| 2006/0161327 A1 | 7/2006 | Emmerich et al. | |
| 2006/0288789 A1 | 12/2006 | Ullmann | |
| 2011/0043352 A1* | 2/2011 | Wagner | 340/442 |

FOREIGN PATENT DOCUMENTS

DE   10 2004 024 388 A1   12/2005
DE   10 2004 042 191 B3    2/2006

* cited by examiner

*Primary Examiner* — Toan N Pham

(57) ABSTRACT

A method is described for monitoring and wirelessly signaling data that contains information on the pressure states prevailing in tires of wheels. In the method, electronic modules that are arranged in the wheels wirelessly transmit the data to a control device which is arranged in the vehicle. No data is transmitted during a first mode associated with a standstill state of the vehicle, while the respective electronic module transmits the data to the control device in the form of telegrams during at least one other mode associated with another state of the vehicle, the transition from a first mode into at least one other mode being determined by means of at least one acceleration sensor.

6 Claims, 8 Drawing Sheets

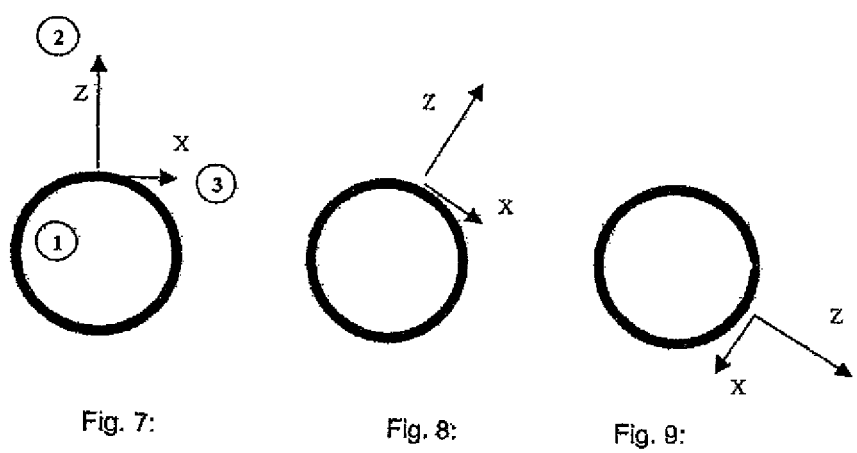

The influence of the acceleration due to gravity can be shown using an Excel table.

| a[g] | v1[m/s^2] | v2(+50%)[m/s^2] | Vehicle[km/h] | f[Hz] | n[rpm] |
|---|---|---|---|---|---|
| | | | TIRE | | |
| 1 | 1.40 | 2.10 | 7.56 | 1.11 | 66.88 |
| 2 | 1.98 | 2.97 | 10.70 | 1.58 | 94.58 |
| 3 | 2.43 | 3.64 | 13.10 | 1.93 | 115.84 |
| 4 | 2.80 | 4.20 | 15.13 | 2.23 | 133.76 |
| 5 | 3.13 | 4.70 | 16.91 | 2.49 | 149.55 |
| 6 | 3.43 | 5.15 | 18.53 | 2.73 | 163.82 |
| 7 | 3.71 | 5.56 | 20.01 | 2.95 | 176.95 |
| 8 | 3.96 | 5.94 | 21.39 | 3.15 | 189.16 |
| 9 | 4.20 | 6.30 | 22.69 | 3.34 | 200.64 |
| 10 | 4.43 | 6.64 | 23.92 | 3.52 | 211.49 |
| 11 | 4.65 | 6.97 | 25.09 | 3.70 | 221.81 |
| 12 | 4.85 | 7.28 | 26.20 | 3.86 | 231.68 |
| 13 | 5.05 | 7.58 | 27.27 | 4.02 | 241.14 |
| 14 | 5.24 | 7.86 | 28.30 | 4.17 | 250.24 |
| 15 | 5.42 | 8.14 | 29.29 | 4.32 | 259.02 |
| 16 | 5.60 | 8.40 | 30.26 | 4.46 | 267.52 |
| 17 | 5.78 | 8.66 | 31.19 | 4.60 | 275.75 |
| 18 | 5.94 | 8.91 | 32.09 | 4.73 | 283.74 |
| 19 | 6.11 | 9.16 | 32.97 | 4.86 | 291.52 |
| 20 | 6.26 | 9.40 | 33.83 | 4.98 | 299.09 |

It is clear that the influence increases significantly at low speeds [+-1g].

Fig. 10

METHOD, SYSTEM, AND SYSTEM COMPONENTS FOR THE WIRELESS MONITORING OF A TIRE PRESSURE

The invention relates to a method for monitoring and wirelessly signalling data that contain information on the pressure states in tires of wheels of a vehicle.

The invention also relates to a system that is suitable therefor, and to system components such as a control device disposed in the vehicle, and an electronic module which is disposed in one of the wheels and transmits data wirelessly to the control device.

The article "Reifendruck-Kontrolisystem, Tyre Safety System-TSS" dated February 2005, which was published in the Automobiltechnischen Zeitschrift (ATZ) (edition 2/2005, VIEWEG Verlag, Germany), describes tire pressure control systems for monitoring and wirelessly signalling various data that contain information on the states in tires of wheels of a vehicle. As described therein with reference to FIGS. 3 and 4, a known system of that type contains a plurality of electronic modules which are disposed in each of the wheels of the vehicle, and which are also referred to as wheel electronics. This wheel electronics system uses sensors to detect the states that exist in the particular tire, such as pressure and temperature, and transmits the related data to a central unit i.e. to a central control device disposed in the vehicle (see FIG. 1 therein). The central control device evaluates the data e.g. in order to activate a tire pressure display (see FIG. 5) installed in the interior of the vehicle. Since the wheel electronics are powered by a miniature battery, typically a lithium battery, it must be ensured that minimal current or energy is consumed in order to prolong the service life of the battery for as long as possible. To this end e.g. the measurement cycles of the sensor system are influenced depending on the motion of the vehicle (see page 3, section 2.2 therein). Accordingly, data are detected and transmitted at shorter measurement intervals only when the vehicle is moving. Data are preferably transmitted in the form of a data telegram (see table 2 therein).

The transmission of the telegrams can also be controlled in certain systems by an interrogator or a transmitter. In that case, a trigger signal is transmitted by the control device to activate the particular wheel electronic system as needed, thereby enabling it to record data and transmit them back to the control device. A return channel and a trigger transmitter and receiver are therefore required for this solution. Although it is therefore also possible to access the individual wheel electronic systems in the wheels specifically, e.g. to detect the exact allocation of the wheel positions, this solution requires a certain amount of complexity. As described therein, likewise with reference to FIG. 1 in the illustration shown on the right, it should be possible in newer systems to omit at least one return channel or a trigger transmitter and receiver.

It is likewise known, from EP 1467877 B1, to activate the particular wheel electronics using an interrogator, i.e. a trigger transmitter, only as necessary in order to extend the battery service life. Particularly reliable monitoring of tire pressure is achieved in that case by designing the system such that the wheel electronics transmit data under their own initiative at a specifiable minimal transmission rate even if the interrogation signal fails for whatever reason. An interrogator could therefore be omitted in the method and system described therein. However, the data would then be transmitted at a very low transmission rate.

EP 0915764 B1 makes known a method for processing signals from a tire-pressure monitoring system, in the case of which the wheel electronics transmit data to the control device under their own initiative in the form of data telegrams, and no actual triggering or interrogation is required. To ensure that the wheel positions can be determined even without triggering or a return channel, it is provided in that case to provide a plurality of receiving antenna on the control device that attempt to jointly process signals arriving via the antenna, and to investigate them for signal intensity. By cyclically shutting off the individual receiving antennae, it can then be determined which of the shut-offs results in the greatest loss of intensity in the radio signal, wherein it is assumed that it must be the antenna that is situated closest to the wheel electronics.

In this solution, it is therefore possible to omit a trigger system entirely, although a greater amount of effort or complexity is required of the receiving antennae.

Furthermore, a method is known that uses a duty cycle of 50% LF at a standstill and 100% during driving, thereby resulting in the corresponding energy consumption.

Furthermore, a method for detecting the transition between standstill and driving is known that makes use of the deflection of an acceleration sensor. Centrifugal force determines the point in time at which switching occurs. There is no compensation for acceleration due to gravity. Typical switching thresholds in this case occur at 25 km/h to 35 km/h, the rollswitch threshold is determined in an absolute manner via the amplitude of the signal, and a relatively high speed threshold is required, due to the measurement error of the acceleration sensor and the error caused by the Earth's attraction.

SUMMARY OF THE INVENTION

The object of the present invention, therefore, is to provide a method and a system or devices of the initially stated type that overcome the aforementioned disadvantages yet can still be realized in a simple way. In particular, a method for monitoring and wirelessly signalling data, a system suitable therefor, and the associated system components should be provided, using which a switching threshold that is independent of speed can be achieved.

The object is solved by a method having the features of claim 1, and by a system, a control device, and an electronic module having the features of the particular alternative dependent claim.

To detect the most accurate switching threshold possible for the instant "tire is moving", motion is detected using the Z sensor and/or the X sensor, and rotational frequency is determined using the X sensor and/or the Z sensor. At "low" speeds (between 5 to 20 km/h), it is possible, via the rotational frequency, to compensate for the influence of the 1 g acceleration due to gravity for any measuring time (FIG. 7-FIG. 8) during wheel rotation and, starting at a predefined switching threshold, to set the "rollswitch" to "ON" depending on the rotational frequency of the wheel.

It is obvious to determine the rotational frequency on the basis of data from the X sensor since it records measured values independently of centrifugal force and therefore normally delivers a higher resolution. It is also possible, however, to implement the method using one sensor. The method advantageously makes it possible to set the switching threshold for a certain rotational frequency without influence by the measuring time or the speed.

It is therefore provided that no data are transmitted during a first mode which is assigned to a standstill state of the vehicle, and for data to be transmitted in the form of telegrams by the particular electronic module or wheel electronics to the control device during at least one further mode which is assigned to another state of the vehicle, wherein the particular electronic module at least occasionally transmits a plurality of telegrams containing the same data, one after the other in clusters, to the control device.

This type of transmission results in a bundled cluster of a plurality of telegrams (also referred to here as the burst mode), and therefore the required data are transmitted to the control device only occasionally, although in concentrated form. This makes it possible to learn the wheel position. As a result, the transmission time is shortened overall, but the actual useful period for transmitting data is shortened not at all or only insubstantially due to the cluster of telegrams, and therefore no data are lost.

Advantageous embodiments of the invention result from the dependent claims.

Accordingly, it is advantageous to transmit data in the form of a first telegram during a second mode which is assigned to a driving state of the vehicle, and, during a third mode which is assigned to a starting-off state of the vehicle, to transmit data only partially in the form of a second telegram that is shorter than the first telegram.

In this case, a distinction is therefore made once more between the actual driving state of the vehicle and a starting-off state; during the starting-off phase, a shortened form of telegrams or the smallest possible quantity of data are transmitted since the demand for data is greater in this state in particular. To meet this increased demand for data by the control device without overloading the batteries of the wheel electronics, the telegrams are shortened to the minimum required size. In turn, the cluster of telegrams ensures that all data from the plurality of wheel electronics are reliably received by the control device, the data being used e.g. to distinguish the axles. This transmission is also referred to here as the burst mode, and it is pointed out that this transmission should not be confused with burst wireless transmission known from the field of mobile communications.

In this context it is particularly advantageous when the particular electronic module or wheel electronic system transmits a plurality of the second telegrams containing the same data, one after the other in clusters, to the control device at least or exclusively during the third mode which is assigned to the starting-off state of the vehicle. Therefore, if a bundle of several shortened telegrams is transmitted, preferably in the starting-off state, it can be ensured that all required data are transmitted within the relatively short starting-off phase, due to the higher density of useful data. In addition, the shortness of the telegrams reduces the amount of current required and therefore spares the battery in the wheel electronics while simultaneously allocating the position of the plurality of wheel electronic systems.

It is also advantageous for the data in the second telegram to contain at least or exclusively information on the rotational direction of the particular wheel, and for the rotational direction to be evaluated to determine whether the particular wheel is disposed on the left side or right side of the vehicle. Due to these measures, the approximate wheel position is detected in a very simple manner, thereby making it possible to determine, at the least, from which side of the vehicle the data were transmitted. Neither a return channel nor a trigger transmitter is required for this purpose.

It is only necessary to detect the direction of rotation. A motion sensor and/or acceleration sensor housed in the electronic module is preferably used for this purpose.

It is also particularly advantageous for the data in the second telegram, i.e. the shortened telegram, to at least contain no information on the particular state that exists in the wheel, and/or on the temperature or pressure that exists in the particular wheel. The second telegram can therefore also be shortened in the starting-off mode such that only those data are transmitted that are required to determine the approximate or more exact wheel position.

In contrast, it is advantageous for the data in the first telegram to at least contain information on the particular pressure state in the wheel and/or the temperature therein. The longer telegram is therefore utilized as extensively as possible in the starting-off mode. In this context it is advantageous for the information on the pressure state to be determined using a pressure sensor integrated in the wheel electronics, and for the information on temperature to be determined using an integrated temperature sensor.

Preferably the control device can also evaluate the data received from the particular module (wheel electronics) and/or supplement the data with additional data.

It is also particularly advantageous for the control device and/or a wireless receiving means connected thereto, e.g. an antenna, to be disposed such that each wheel spindle is situated a different distance away therefrom, and for the radio signals received by the particular module to be compared with each other, in the control device, in terms of their reception field strength to determine whether the particular wheel is disposed on one of the front wheel spindles or one of the rear spindles. By means of the reception field strength it is therefore easily determined whether the particular wheel electronic system is mounted on a front axle or a rear axle. In this context it is furthermore advantageous for the information on the direction of rotation of the particular wheel, which is contained in the data that were received, to be evaluated on the basis of the reception-amplifying reception signals to determine the point at which the particular wheel is disposed.

On the basis of the direction of rotation it can therefore be first determined whether the particular wheel is disposed on the left side or right side of the vehicle, and immediately thereafter whether the wheel is disposed on the front axle or the rear axle, on the basis of the reception field strength. In summary, it is therefore possible to accurately determine the individual wheel position in a specific, rapid, and simple manner.

It is also preferable for the control device to provide the data it has evaluated and/or supplemented as the result data via an interface, in particular a data bus, to further devices and/or modules that are installed in the vehicle. Accordingly, the control device can be designed as a central data acquisition and evaluation device that provides its result data for further devices and/or modules, such as display devices, via an interface that is preferably standardized. In this context it is advantageous for the control device to provide the result data in the form of a third data telegram via the data interface or the data bus. This data telegram can be designed independently of the aforementioned wireless data telegrams, and can be e.g. a standardized data bus telegram, such as for the CAN bus or the like. It is furthermore advantageous for the duty cycle to be switched from 50%/100% to 0%/100%, depending on the number of driving cycles—the switch between the stillstand mode and the driving mode—of e.g. 50, thereby saving even more energy. It is furthermore advantageous to set the wheel electronics in the standstill mode with a duty cycle of 0% LF after production.

BRIEF DESCRIPTION OF THE DRAWING

The invention is described in greater detail in the following with reference to various embodiments, and with reference to the attached drawings, which show:

FIG. 7 a wheel with measuring time at 0°

FIG. 8 a wheel with measuring time at ~29°

FIG. 9 a wheel with measuring time at ~121°

FIG. 10 the influence of acceleration due to gravity

DETAILED DESCRIPTION

Figure 1:
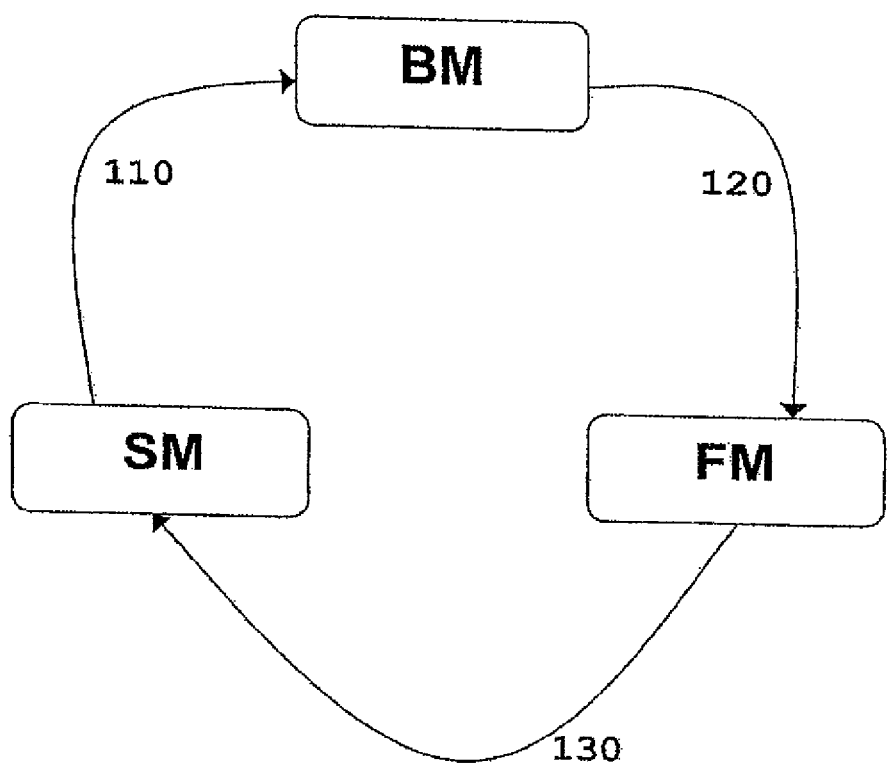
FIG. 1 the various operating modes which are defined for the method and the system, in the form of a state diagram.
Figure 2:
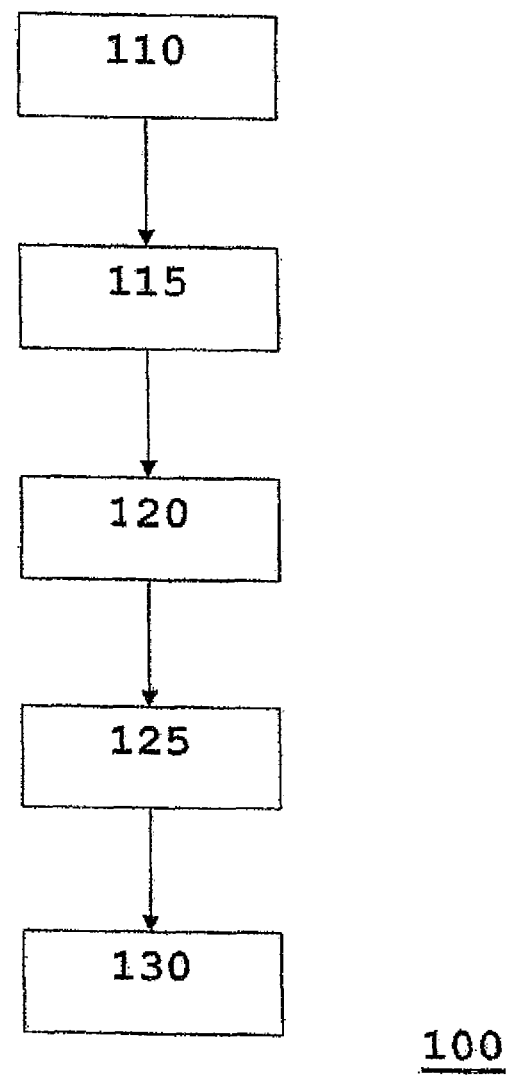
FIG. 2 the method according to the invention, including its individual steps, in the form of a flow chart.
Figure 3:
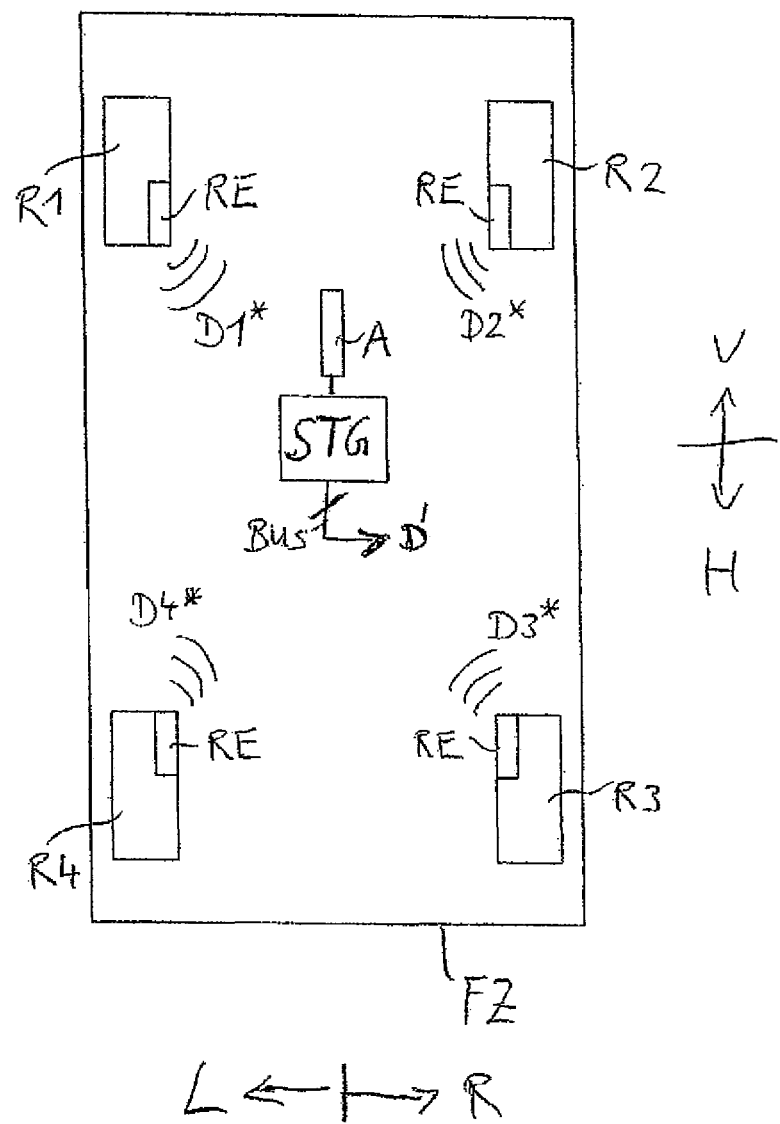
FIG. 3 a schematic depiction of the arrangement of the various system components in a vehicle.

Before discussing FIGS. 1 and 2, and the method according to the invention, in greater detail, the basic design of the system according to the invention will first be explained with reference to FIGS. 3 and 4:

FIG. 3 shows the basic design and installation of a system in a vehicle FZ, wherein electronic modules or wheel electronics RE are installed in individual wheels R1 through R4 of the vehicle, and wirelessly transmit their data D1* through D4* to a control device STG which is installed in the vehicle as the central control unit. Control device STG is connected to a wireless reception means in the form of an antenna A to receive the radio signals from individual wheel electronics RE and to evaluate the data contained therein. Control device STG is connected via a data interface or a data bus BUS to further devices and/or modules (not depicted), and provides them with result data D' obtained from the evaluation of the received data D1* through D4*, and possibly with further additional data.

Control device STG or the antenna is not disposed in the center of vehicle FZ, but rather is preferably situated asymmetrically to the transverse axis of the vehicle, that is, either in the front part or the rear part of the vehicle. As a result, the radio signals from individual wheel electronics RE arrive at the antenna A of control device STG with different reception field strengths, thereby making it possible to determine whether the particular wheel electronics are disposed in front part V or rear part H of vehicle FZ.

Figure 4:
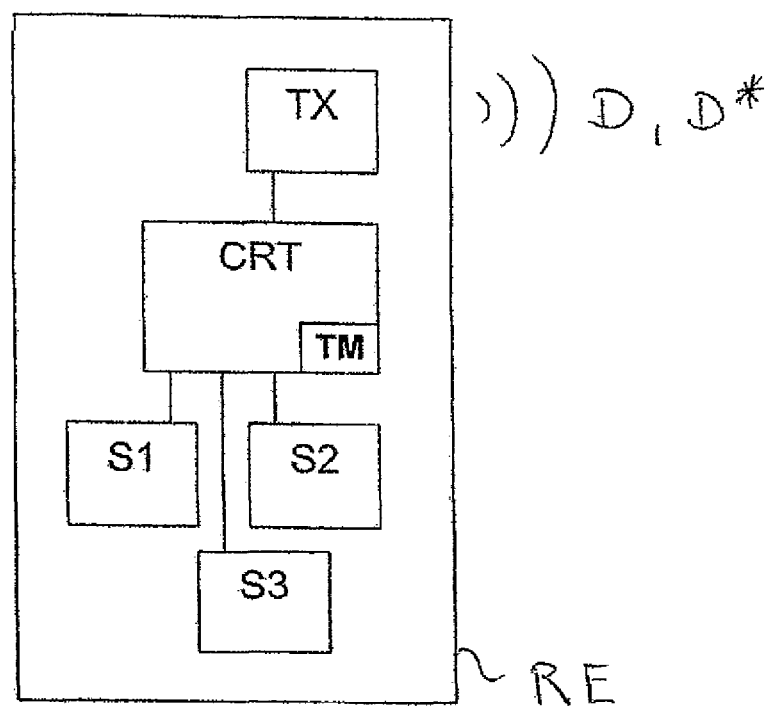
FIG. 4 a schematic depiction of the design of an electronic module or wheel electronic system according to the invention.

FIG. 4 shows, in the form of a block diagram, the design of a wheel electronic system RE which is integrated in a wheel. The wheel electronic system mainly contains a micro-controller CRT which includes an integrated timer TM and is connected to various sensors S1 through S3. The sensors are e.g. a pressure sensor S1, a temperature sensor S2, and at least one acceleration sensor 53. Micro-controller CRT processes the data delivered by the sensors and transfers them to a transmitting unit TX which, in turn, transmits data D or D* wirelessly to control device STG.

The mode of operation of the system, which is described, and its components, and the principle of the method according to the invention will now be described in greater detail with reference to FIGS. 1 and 2, and to FIG. 5:

In the method according to the invention, the particular electronic module or particular wheel electronic system RE transmits data D* to control device STG at least during the starting-off phase of the vehicle, data D* being transmitted at least occasionally in the form of several telegrams DT* which contain the same data D* and are transmitted one after the other in clusters. This mode is labelled mode BM in FIG. 1, and is therefore also referred to here as the burst mode. Preferably this mode is operated only in the starting-off phase, that is, in the state in which the vehicle transitions from a stillstand mode SM to a driving mode FM. Accordingly, burst mode BM refers in particular to the starting-off phase of the vehicle, in which the individual wheel electronics RE transmit data D* in repeated, preferably shortened telegrams DT* to control device STG which can also determine the particular wheel position, in particular, on the basis of the data.

Once the starting-off phase of the vehicle has ended and the vehicle is in the actual driving mode FM, data D are transmitted in the form of longer telegrams DT, and a cluster, as in the burst mode, can be omitted. Data D that are transmitted in driving mode FM contain as much information as wheel electronics RE can provide to control device STG. In contrast, only those data D* are transmitted in burst mode BM that are required to detect the individual wheel position, such as information on rotational direction RL of the wheel and/or an identification ID or the identity of the wheel itself.

Once the driving state of the vehicle has ended, second mode FM is exited, and the transition to stillstand mode SM occurs. Preferably no data are transmitted by wheel electronics RE in this mode SM. As soon as vehicle FZ starts off once more, which can be determined e.g. by an acceleration sensor (see S3 in FIG. 4), the transition to the starting-off mode or burst mode BM takes place. As shown in FIG. 1, the state of the vehicle switches from a first mode SM which describes the stillstand state of the vehicle, to a second mode FM which describes the driving state of the vehicle, via an intermediate mode which corresponds to a further mode, namely the burst mode BM. Third mode BM relates to the particular starting-off state of the vehicle.

Method 100 and its steps 110 through 130 will now be described in greater detail with reference to FIG. 2, and reference is also made to FIGS. 1 and 5.

Method 100 starts with step 110, in which the transition from first mode SM to third mode BM, the starting-off mode, takes place. This is detected e.g. by acceleration sensors (see sensor S3 in FIG. 4), and can also be controlled using a timer (see timer TM in FIG. 4) such that mode BM is maintained only for a limited time period. Data transmission for mode BM is carried out in a step 115 by particular module or wheel electronic system RE transmitting its data D* in a plurality of clustered telegrams to control device STG.

Figure 5:
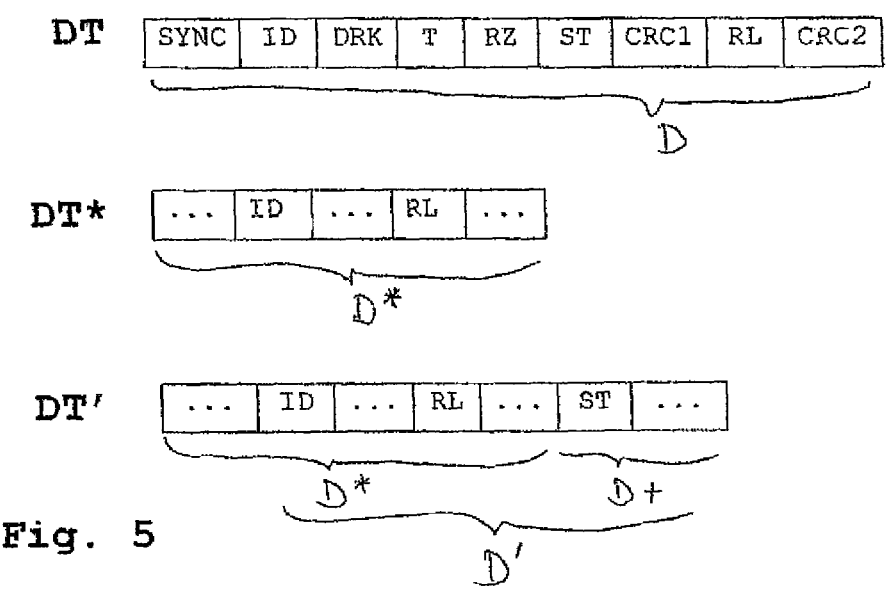
FIG. 5 the different data telegrams that are used in the method and the system.
Figure 6:
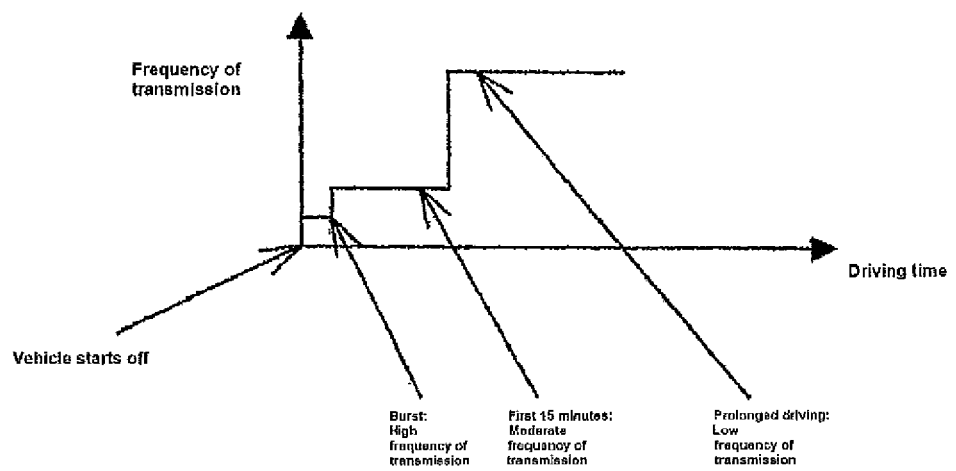
FIG. 6 the dependence of the frequency of transmission on driving time

As shown in FIG. 5, particular wheel electronic system RE transmits a shortened telegram DT* which includes only a few data D* of the typically several data D that are transmitted in longer data telegrams DT in the normal driving mode FM. Short telegram DT* is a telegram that is e.g. 9 bytes long and contains at least one characteristics identification ID for particular wheel electronic system RE and therefore also for the particular wheel, and information RL that indicates the rotational direction of the particular wheel. Simply on the basis of identifications ID, control device STG can check to determine whether all wheel electronic systems RE are operable, and whether at least four different identifications ID and therefore wheels are detected. In addition, control device SZG can detect, on the basis of information RL, whether the particular wheel is disposed on the left side or right side of the vehicle. If information RL shows e.g. that the wheel rotates to the right, it is assumed that the wheel is disposed on the right side R of the vehicle. In the opposite case it is assumed that the wheel is disposed on the left side L of the vehicle. The wheels can therefore be located simply on the basis of this small amount of information.

In step 115 as well, the reception field strength of the particular signals that were received from control device STG are evaluated and compared to each other. Given that the control device and antenna A (see also FIG. 3) are disposed closer to the front of the vehicle or to the rear of the vehicle, it is easy to determine, on the basis of the reception field strength, whether particular wheel electronic system RE is disposed on a front axle V or a rear axle H of vehicle FZ. Combined with the side position and/or the direction of rotation of the wheel electronics (on the left side or right side of the vehicle) that was determined previously, the position of the individual wheels is therefore determined exactly. If information RL indicates e.g. that the wheel rotates to the right and, if antenna A is installed closer to the front axle, then control device STG detects a relatively high reception field strength and it is assumed that this wheel is disposed on the right side R of the vehicle on front axle V. Based on the illustration shown in FIG. 3, the position of wheel R2 would therefore be unambiguously identified. The other wheels are detected in an analogous manner.

Accordingly, the positions of the individual wheels can be identified quickly and unambiguously in step 115 simply on the basis of short data telegrams DT*, and a current pressure display can be realized in the FZ using individual DT in step 115.

In addition, the transmission of shortened data telegrams DT* in a clustered manner or in the burst mode ensures that the required data are also received completely and correctly by control device STG. Shortened telegram DT* can contain data in addition to aforementioned data ID and RL, such as synchronization data and test data such as checksum data.

Overall, however, telegram DT* is markedly shortened compared to typical telegram DT. Telegram DT* contains e.g. only 9 bytes, while longer telegram DT contains e.g. 15 bytes. As shown in FIG. 5, longer telegram DT, which is transmitted in subsequent driving mode FM, can also contain information on pressure state DRK and temperature T in the particular wheel. These data are recorded using the appropriate sensors, namely pressure sensor S1 and temperature sensor S2 (see FIG. 4). In addition, telegram DT can also contain information RZ on the remaining service life of the battery.

The method proposed herein uses aforementioned burst mode BM, which is a cluster of shortened telegrams DT*, for the transmission events while the vehicle starts off. Several telegrams DT* having the same data content or at least similar data content are transmitted within a short time period of e.g. 1 minute. This transmission makes it possible to identify the wheels very quickly, and energy is saved since the telegram length is shortened from e.g. 15 bytes to 9 bytes. If e.g. 25 telegrams are transmitted, one after the other, in a cluster, then shortening telegram DT* results in energy demand being reduced by approximately 40% compared to normal telegram DT. This is achieved without losing any information.

If the starting-up phase or mode BM has ended, the next mode is switched to in a step 120, the next mode being mode FM which relates to the driving state of the vehicle. Longer data telegram DT is used in a step 125 to now send all—if possible—recorded data D from particular wheel electronics RE to control device STG. Data telegram DT can be transmitted in a cluster in mode FM as well, although this is not necessary. In a step 130, once the path state has ended, the transition to the stillstand state, i.e. mode SM, occurs. As described above, no data are transmitted in first mode SM.

In all, the various modes therefore make it possible to transfer data in an optimal manner in terms of information content and energy savings. Due to the differentiation, which is proposed here, between the actual driving state and the starting-off state of the vehicle, data are transmitted in an optimized manner using shortened data telegrams, in particular for the starting-off phase of the vehicle.

In addition to the actual data transmission between particular wheel electronics RE and control device STG, the invention also relates to a further transmission of result data DT' (see FIG. 5) from control device STG to further devices and modules installed in the vehicle, e.g. on display devices in the instrument panel. To this end, control device STG evaluates data D and D* that were received, and supplements them with, as necessary, with additional data D+ to form result data D'. The result data are transmitted e.g. using a standardized bus data telegram DT' to the further devices and modules. Additional data D+ can be e.g. a status bit or byte ST that relates to the reception field strengths determined by control device STG, and that indicates whether particular wheel electronic system RE is disposed on a front axle or a rear axle of the vehicle. Status bit ST can therefore take on state V or state H (see FIG. 3). In combination with information RL transmitted by wheel electronics, which can take on status L or R, the position of the wheel is then unambiguously identified.

To determine the most accurate switching threshold possible for the instant at which the tire starts to move, motion is detected by the Z (or X) sensor, and rotational frequency is detected by the X (or Z) sensor, as depicted in FIGS. 7, 8, and 9.

At low speeds (approximately 5 to 20 km/h), it is possible, via the rotational frequency, to compensate for the influence of the 1 g acceleration due to gravity for any measuring time (FIGS. 7, 8, 9) during wheel rotation and, starting at a predefined switching threshold, to set the "rollswitch" to "ON" depending on the rotational frequency of the wheel.

In a special embodiment, rotational frequency is determined on the basis of data from the X sensor since it records measured values independently of centrifugal force and therefore normally delivers a higher resolution.

The method according to the invention, which is described herein, and the devices or units that implement the method relate to particularly advantageous embodiments and should therefore not be understood in a limited sense. Instead, the scope of protection of the invention also relates to further modifications and is determined in particular by the wording of the patent claims.

LIST OF REFERENCE CHARACTERS

SM First mode (standstill mode)
FM Second mode (driving mode)
BM Third mode (burst mode)
100 Method having (sub) steps 110-130
DRK Information on pressure states in wheels (R1-R4)
FZ Vehicle
STG Control device
A Antenna
BUS Interface or data bus
R1-R4 Wheels
RE Electronic module or wheel electronics
S1, S2, S3 Various sensors for pressure (S1), temperature (S2), and acceleration (S3)
CRT Micro-controller
TX Transmitter (in the wheel electronics)
D Data (normal scope) from wheel electronics
D* Data (shortened scope) from wheel electronics
D+ Additional data from the control device
D' Result data from the control device (for the data bus)
DT Data telegram (normal)
DT* Data telegram (shortened)
DT' Data telegram (for result data on the data bus)

ID, RL, DRK, T, RZ, ST Data or information on the particular wheel/tire, in particular identification (ID), right-left (RL), pressure (DRK)

SYNC, CRC1, CRC2 Data for synchronization or a plausibility check (checksum)

The invention claimed is:

1. A method for monitoring and wirelessly signaling data that contains information on a pressure states in tires of wheels of a vehicle, said method comprising:
    transmitting data wirelessly by electronic modules disposed in the wheels to a control device disposed in the vehicle, wherein a first mode is assigned to a standstill state of the vehicle;
    transmitting by the electronic module telegram form data to the control device during a second mode which is assigned to another state of the vehicle; and
    determining a transition from the first mode to the second mode by at least one acceleration sensor; and
    transmitting by the electronic module telegram form data to the control device during a third mode which begins once a switching threshold has been reached and/or n minutes after driving was initiated.

2. The method according to claim 1, wherein a rotational frequency of a particular wheels is determined by a further acceleration sensor.

3. The method according to claim 1, wherein predefined switching thresholds are used to switch from one mode to another mode.

4. The method according to claim 3, wherein the switching threshold is a rotational frequency.

5. A method for monitoring and wirelessly signaling data that contain information on a pressure in tires of wheels of a vehicle, wherein the data are transmitted wirelessly in a form of telegrams by electronic modules disposed in the wheels to a control device disposed in the vehicle, the electronic modules being switched by an acceleration sensor from a first mode which is assigned to a standstill state of the vehicle to a starting mode which is assigned to a starting-off state of the vehicle, the electronic modules send in the starting mode telegrams which contain information on a direction of rotation and an identification and which are shortened by containing no information on a temperature in the wheel.

6. A method for monitoring and wirelessly signaling data that contain information on a pressure in tires of wheels of a vehicle, wherein the data are transmitted wirelessly in a form of telegrams by electronic modules disposed in the wheels to a control device disposed in the vehicle, the electronic modules being switched by an acceleration sensor from a first mode which is assigned to a standstill state of the vehicle to a starting mode which is assigned to a starting-off state of the vehicle, the electronic modules send in the starting mode telegrams which contain information on a direction of rotation and an identification and which are shortened by containing no information on the pressure in the wheel.

* * * * *

UNITED STATES PATENT AND TRADEMARK OFFICE
CERTIFICATE OF CORRECTION

| | | |
|---|---|---|
| PATENT NO. | : 8,576,058 B2 | Page 1 of 1 |
| APPLICATION NO. | : 12/989910 | |
| DATED | : November 5, 2013 | |
| INVENTOR(S) | : Markus Wagner | |

It is certified that error appears in the above-identified patent and that said Letters Patent is hereby corrected as shown below:

In the Claims

In Column 9, line 8, the word "states" should be changed to --state--.

In Column 9, line 24, the word "wheels" should be changed to --wheel--.

Signed and Sealed this
Fourteenth Day of January, 2014

Michelle K. Lee
*Deputy Director of the United States Patent and Trademark Office*